United States Patent
Pollack et al.

(10) Patent No.: US 10,321,510 B2
(45) Date of Patent: Jun. 11, 2019

(54) KEEP ALIVE INTERVAL FALLBACK

(71) Applicant: Apple Inc., Cupertino, CA (US)

(72) Inventors: Daniel B. Pollack, San Francisco, CA (US); Yu Xing, Cupertino, CA (US); Venkateswara Rao Manepalli, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/702,921

(22) Filed: Sep. 13, 2017

(65) Prior Publication Data

US 2018/0352586 A1 Dec. 6, 2018

Related U.S. Application Data

(60) Provisional application No. 62/514,065, filed on Jun. 2, 2017.

(51) Int. Cl.
*H04W 52/02* (2009.01)
*H04W 76/25* (2018.01)
*H04W 76/38* (2018.01)

(52) U.S. Cl.
CPC ....... *H04W 76/25* (2018.02); *H04W 52/0254* (2013.01); *H04W 52/0261* (2013.01); *H04W 76/38* (2018.02)

(58) Field of Classification Search
CPC . H04W 76/25; H04W 52/0251; H04W 76/27; H04W 24/02; H04W 28/0231; H04W 28/0236; H04W 28/0289; H04W 52/0258; H04W 76/20; H04W 76/38; H04W 84/12; H04W 76/19; H04W 60/02; H04W 24/04; H04W 52/0261; H04L 67/145; H04L 43/10; H04L 67/14; H04L 69/28; H04L 69/16; H04L 45/026; H04L 43/0811; H04L 45/28; H04L 41/00; H04L 41/0654; H04L 41/0813; H04L 47/193; H04L 69/40; G06F 11/0757

See application file for complete search history.

(56) References Cited

U.S. PATENT DOCUMENTS

| 2012/0008536 A1* | 1/2012 | Tervahauta | H04L 43/0811 370/311 |
|---|---|---|---|
| 2012/0124431 A1 | 5/2012 | Bauer et al. | |
| 2013/0246641 A1 | 9/2013 | Vimpari et al. | |

(Continued)

FOREIGN PATENT DOCUMENTS

| JP | 2012222378 A | * 11/2012 |
| JP | 2016184795 A | * 10/2016 |
| WO | WO 2015002831 A1 | 1/2015 |

*Primary Examiner* — Daniel Lai
(74) *Attorney, Agent, or Firm* — Meyertons Hood Kivlin Kowert and Goetzel PC; Jeffrey C. Hood

(57) ABSTRACT

Methods and user equipment devices (UEs) are disclosed for performing keep alive interval fallback. During an active connection with a remote network, a UE may operate in a steady state configuration wherein keep alive message are periodically sent to the remote network. The UE may determine that a keep alive message has failed to receive an acknowledgement (ACK) response. Based on the determination that the keep alive message has failed, the UE may trigger keep alive interval fallback, wherein the UE sends keep alive messages at a shorter duration for a predetermined period of time.

20 Claims, 4 Drawing Sheets

(56) References Cited

U.S. PATENT DOCUMENTS

| | | | | |
|---|---|---|---|---|
| 2015/0055594 A1* | 2/2015 | Nirantar | ............... | H04W 76/25 |
| | | | | 370/329 |
| 2016/0014020 A1* | 1/2016 | Kafle | ................... | H04W 24/04 |
| | | | | 370/228 |
| 2016/0087907 A1* | 3/2016 | Ajitomi | ................... | H04L 47/28 |
| | | | | 370/389 |
| 2016/0150589 A1* | 5/2016 | Zhao | ...................... | H04L 67/14 |
| | | | | 370/328 |
| 2017/0171517 A1* | 6/2017 | Modestine | ......... | H04N 5/23206 |

* cited by examiner

KEEP ALIVE INTERVAL FALLBACK

PRIORITY CLAIM

This application claims priority to U.S. provisional patent application Ser. No. 62/514,065, entitled "Keep Alive Interval Fallback," filed Jun. 2, 2017, which is hereby incorporated by reference in its entirety as though fully and completely set forth herein.

FIELD

The present application relates to wireless devices, including a system and method for performing keep alive interval fallback during a wireless communication session.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or WI-FI™), IEEE 802.16 (WiMAX), BLUETOOTH™, and others.

Electronic devices may communicate with a remote server using an active connection. The connection may be of various types (for example, a TCP connection or other type of connection), and the connection may operate according to various wireless communication technologies. For some active connections, the electronic device may periodically send keep alive messages to the remote server, to keep the connection active. Sending keep alive messages too frequently may unnecessarily drain the battery of the device, but sending keep alive too infrequently may lead to a termination of the connection. Improvements in field of intelligent keep alive message scheduling are therefore desirable.

SUMMARY

Embodiments are presented herein of, inter alia, methods for performing keep alive interval fallback during a wireless communication session, and of devices configured to implement the methods.

In some embodiments, a UE comprising a processor and a radio is configured to perform keep-alive interval fallback. In these embodiments, the UE may establish a connection with a remote device. The UE may send a keep alive message to the remote device according to a steady state period. The UE may determine that the connection has failed based at least in part on a failure to receive feedback from the remote device in response to the keep alive message. The UE may shorten the steady state period for sending keep alive messages for a first duration of time of based at least in part on the determination that the connection has failed.

In some embodiments, the UE is further configured to determine that the remote device is associated with a timeout-limited carrier, wherein shortening the period for sending keep alive messages is performed further based on the determination that the remote device is associated with a timeout-limited carrier.

In some embodiments, the UE is further configured to determine an amount of movement of the UE, and shorten the period for sending keep alive messages for a first duration of time further based on a determined amount of movement of the UE exceeding a predetermined threshold.

In some embodiments, the UE is further configured to determine that the UE has toggled airplane mode on and off, and reperform the ramp up procedure in response to the determination that the UE has toggled airplane mode on and off.

In some embodiments, shortening the period for sending keep alive messages for a first duration of time is performed further based on a determination that the UE is in a first location.

In some embodiments, the UE is further configured to determine that the UE has toggled airplane mode on and off, and reperform the ramp up procedure in response to the determination that the UE has toggled airplane mode on and off.

In some embodiments, the established connection is a cellular connection. In some embodiments, the established connection is a WI-FI™ connection.

In some embodiments, the steady state period is determined as part of a ramp up procedure, and the UE is further configured to reinitiate the ramp up procedure upon expiration of the first period of time.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
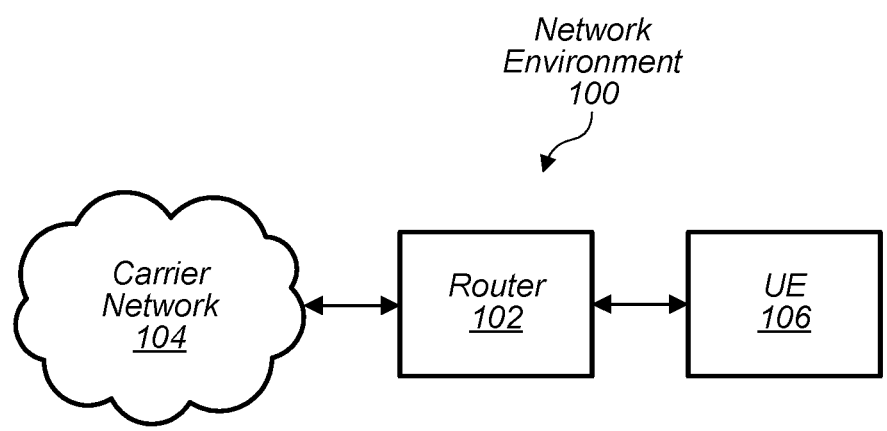
FIG. 1 illustrates an exemplary (and simplified) wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices including multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) that is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while BLUETOOTH™ channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—Wireless Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a user device 106, which communicates in a wireless manner with a router 102, where the router 102 in turn is coupled (communicatively) to a carrier network 104. The user device may be referred to herein as a "user equipment" (UE). The carrier network 104 may be, for example, a core network of a cellular service provider, a telecommunication network such as a public switched telephone network (PSTN), and/or the Internet, among various possibilities.

The carrier network 104 may include hardware that enables communication, via the router 102, with the UE 106. The router 102 may configured to authenticate a communication session between the UE 106 and the carrier network 104, thus facilitating communication between the UE 106 and the network 104.

In some embodiments, the network hardware (e.g., switches, routers, memories/queues/buffers, network processors, controllers, etc.) in carrier network 104 and/or router 102 is located at least partially in one or more cellular traffic routing/control mechanisms in carrier network 104. For example, carrier network 104 can include, but is not limited to, a base station controller (BSC), a base station subsystem (BSS), a mobile switching center (MSC), a network station subsystem (NSS), one or more cell towers including antennas and processing hardware, and/or other routing/control mechanisms, and any or all of these routing/control mechanisms can relay data transmissions between the UE 106 and the carrier network 104 according to embodiments described herein.

The router 102 and the UE 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), 3GPP2 CDMA2000 (e.g., 1×RTT, 1×EV-DO, HRPD, eHRPD), etc.

Additionally, one or more routers (such as router 102) may be communicatively coupled to the carrier network 104 and the UE 106. These routers may include access points configured to provide a wireless local area network (WLAN) to support cellular network offloading and/or otherwise provide wireless communication services as part of the wireless communication system illustrated in FIG. 1. Such a WLAN may be configured to operate according to any of various communications standards, such as the various IEEE 802.11 (WI-FI™) standards.

The UE 106 may be a device with cellular communication capability, such as a mobile phone, a smart phone, a handheld device, a wearable device, a computer or a tablet, or virtually any type of wireless device with network communication capabilities.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) or ASIC that is configured to perform any of the method embodiments described herein, or any portion of any of the method embodiments described herein.

The UE 106 may include one or more antennas for communicating using one or more wireless communication protocols or technologies. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple (communicatively) to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

Note that a UE 106 may be capable of communicating using multiple wireless communication standards. For example, a UE 106 may be configured to communicate using a wireless networking (e.g., WLAN) and/or peer-to-peer wireless communication protocol (e.g., BT, WLAN peer-to-peer, etc.) in addition to at least one cellular communication protocol (e.g., GSM, UMTS (WCDMA, TD-SCDMA), LTE, LTE-A, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

In some embodiments, the UE 106 may include separate (and possibly multiple) transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of WLAN and BLUETOOTH™. Other configurations are also possible.

Figure 4:
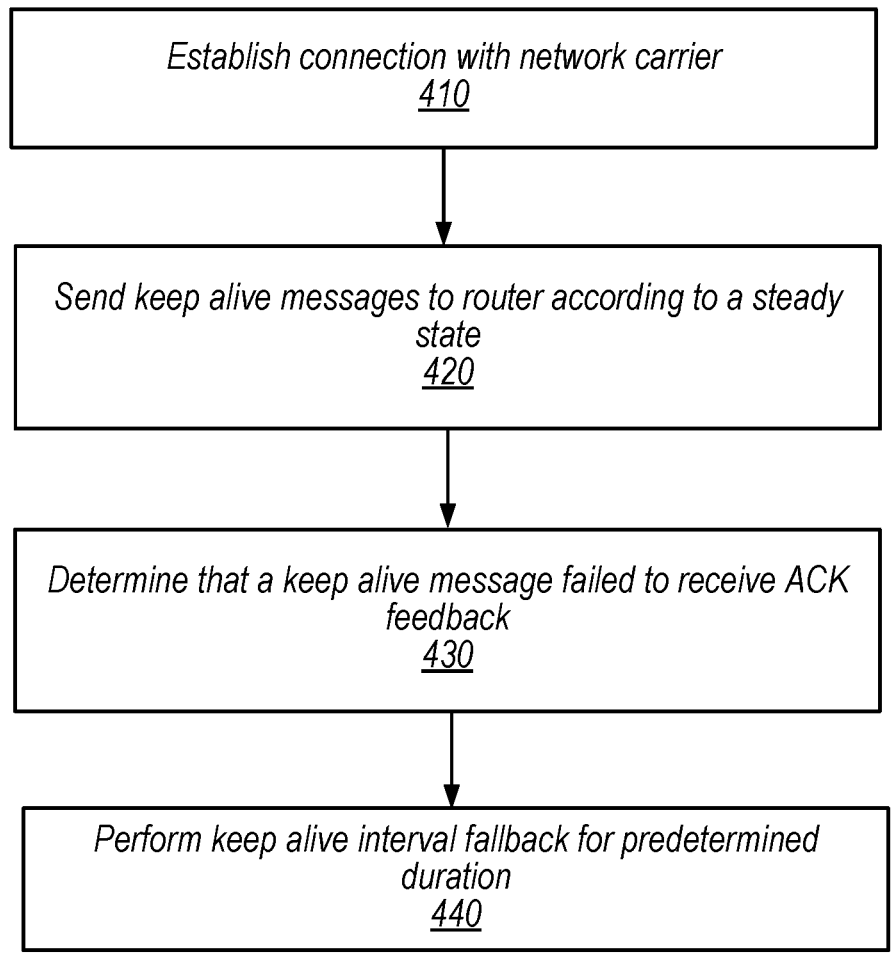
FIG. 4 presents a flow chart diagram illustrating an example method for performing keep alive interval fallback, according to some embodiments.

Any or all of the network 104, router 102, and/or UE 106 illustrated in FIG. 1 may be configured to implement or support implementation of part or all of the methods described herein, including, inter alia, the method of FIG. 4. In some embodiments, as further described below, a UE 106 may be configured to perform methods for performing keep alive interval fallback during an active communication session with the carrier network 104.

Figure 2:
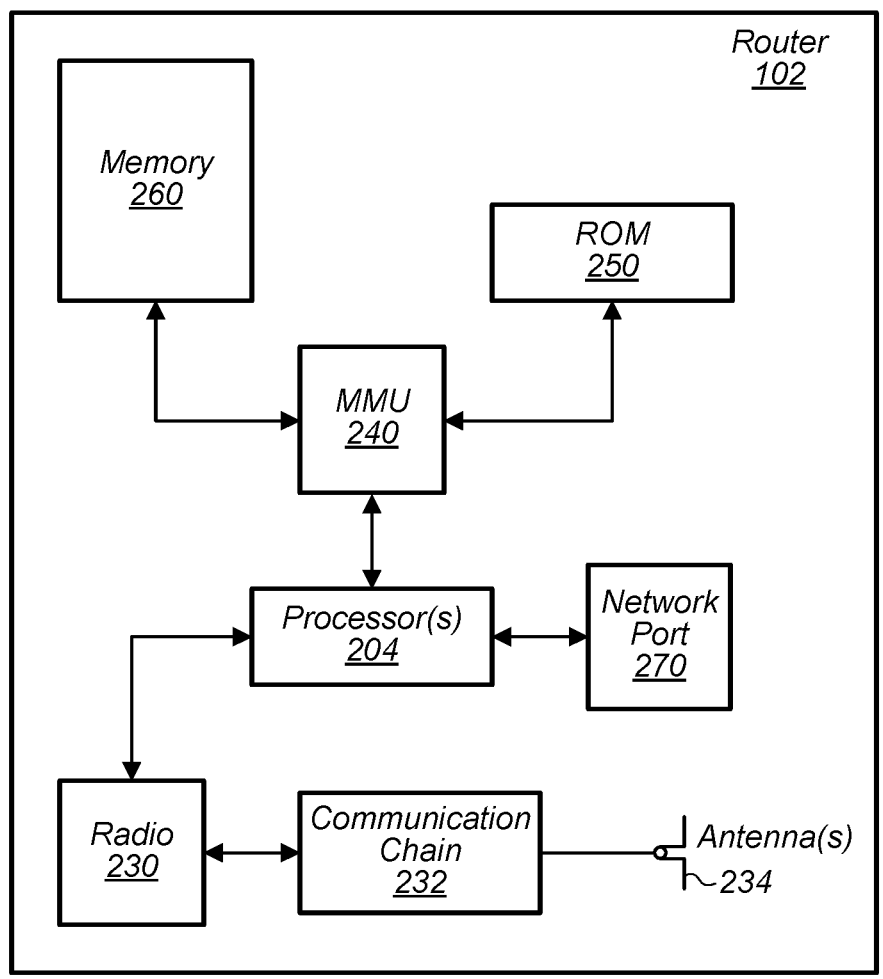
FIG. 2 illustrates an exemplary block diagram of a router, according to some embodiments.

FIG. 2—Exemplary Block Diagram of a Router

FIG. 2 illustrates an example block diagram of router 102. It is noted that the block diagram of the router of FIG. 2 is only one example of a possible system. As shown, the router may include processor(s) 204, which may execute program instructions for the router. The processor(s) 204 may also be coupled (directly or indirectly) to memory management unit (MMU) 240, which may be configured to receive addresses from the processor(s) 204 and to translate those addresses to locations in memory (e.g., memory 260 and/or read only memory (ROM) 250) or to other circuits or devices.

The router may include at least one network port 270. The network port 270 may be configured to connect to a wired network and provide a plurality of devices, such as UE 106, access to the carrier network and/or to the Internet. For example, the network port 270 (or an additional network port) may be configured to connect to a local network, such as a home network or an enterprise network. For example, port 270 may be an Ethernet port. The local network may provide connectivity to additional networks, such as a cellular network or the Internet. The router may alternatively be included within a cellular base station.

The router may include at least one antenna 234, which may be configured to operate as a wireless transceiver and may be further configured to communicate with a UE 106 via wireless communication circuitry 230. The antenna(s) 234 communicates with the wireless communication circuitry 230 via communication chain 232. Communication chain 232 may include one or more receive chains, one or more transmit chains or both.

While various embodiments described herein relate to cellular functionality of the router, they may also apply to WLAN (e.g., 802.11). For example, in some embodiments, the wireless communication circuitry 230 may include WLAN communication circuitry for performing WLAN communication, e.g., in addition or alternatively to cellular communication circuitry. For example, in some embodiments, the router may be configured to act as an access point to provide an infrastructure mode 802.11 network to wireless stations in the vicinity of the router. Additionally or alternatively, the router may be configured to act as a peer station to perform peer-to-peer communications with nearby wireless stations.

Regardless of the particular communication standard used, as further described below, the router may be configured to perform and/or support performance of methods for a wireless device to perform keep alive interval fallback according to embodiments described herein.

Figure 3:
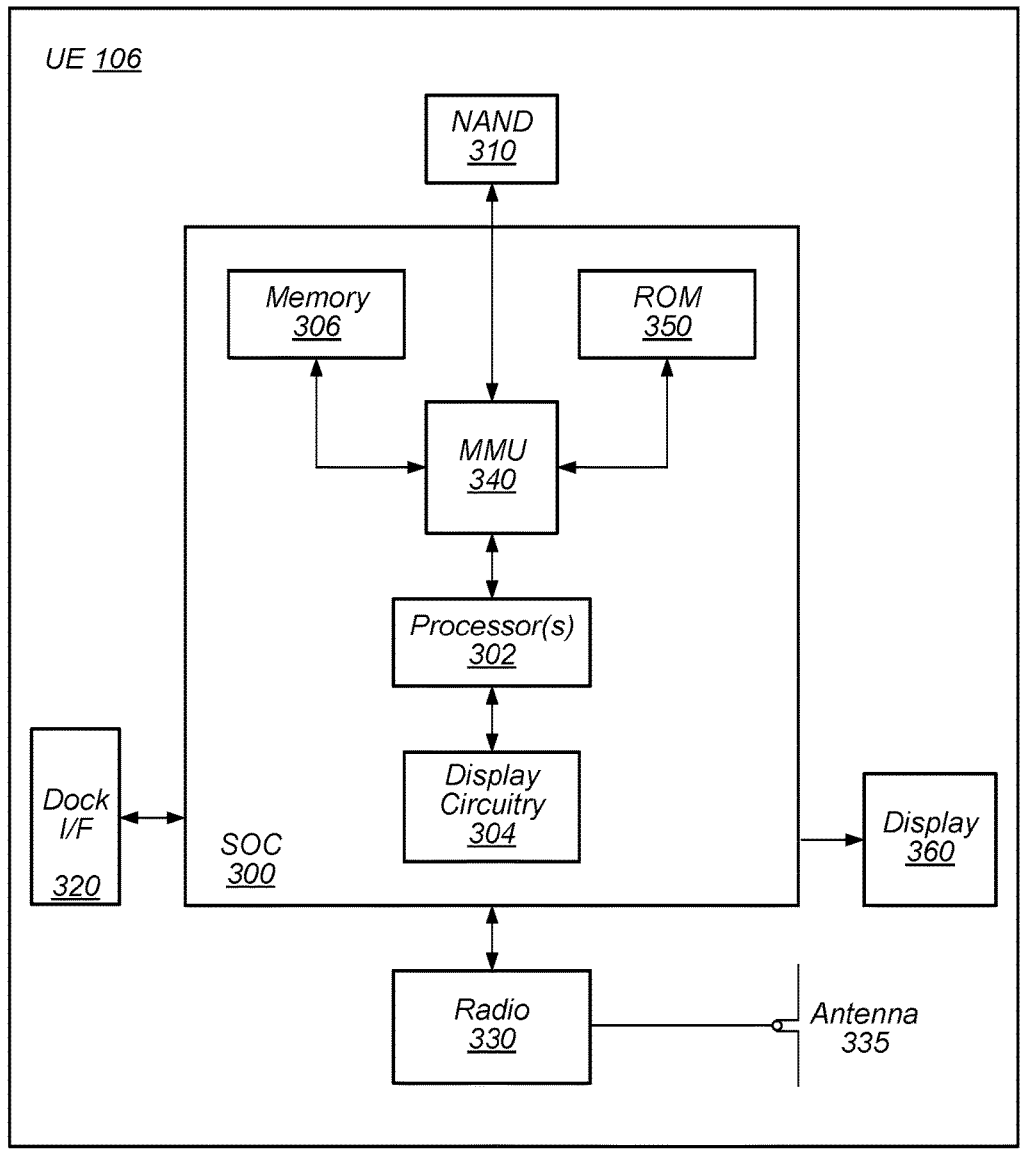
FIG. 3 illustrates an exemplary block diagram of a UE, according to some embodiments.

FIG. 3—Exemplary Block Diagram of a UE

FIG. 3 illustrates an exemplary block diagram of a UE 106, according to some embodiments. As shown, the UE 106 may include a system on chip (SOC) 300, which may include portions for various purposes. For example, as shown, the SOC 300 may include processor(s) 302, which may execute program instructions for the UE 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry (e.g., radio) 330 (e.g., for LTE, WLAN, GPS, etc.).

The UE device 106 may include at least one antenna, (and possibly multiple antennas, e.g., for MIMO and/or for implementing different wireless communication technologies, among various possibilities) performing wireless communication with base stations and/or other devices. For example, the UE device 106 may use antenna(s) 335 to perform the wireless communication. As noted above, the UE 106 may be configured to communicate wirelessly using multiple wireless communication technologies in some embodiments.

As described further subsequently herein, the UE 106 may include hardware and software components for implementing features for a suspended baseband state, such as those described herein with reference to, inter alia, FIG. 4. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein, such as the features described herein with reference to, inter alia, FIG. 4.

Network Address Translation (NAT) Timeout

In some embodiments, a UE may have established a persistent connection with a remote entity or server. The connection may be any of a variety of types of connections, such as a transmission control protocol (TCP) connection, a multipath TCP (MPTCP) connection, a push connection, or another type of connection. In some embodiments, a push connection may be established to perform push message services between the carrier network and the UE. In some embodiments, the push connection is a special connection that the device keeps open to receive push notifications and FaceTime calls. In some embodiments, the push connection may be established as a transmission control protocol (TCP) connection. Establishing a push connection may require a handshake procedure between the push server and the UE. In some embodiments, the establishment of the connection may involve an internet protocol (IP) address being reserved for the UE for the duration of the connection. The connection may be established over a cellular communication technology (e.g., GSM, UMTS (WCDMA, TD-SCDMA), LTE, LTE-A, HSPA, 3GPP2 CDMA2000 (e.g., 1×RTT, 1×EV-DO, HRPD, eHRPD), etc.), or another wireless communication technology. As noted above, in some embodiments, the connection may be established over WLAN, or another short range wireless technology.

In a wireless communication system, certain routers may be part of a particular carrier's network. The network may assign an IP address to a UE for the duration of a connection. However, if the UE is idle for an extended period of time, the carrier network may terminate the connection. Once a connection is terminated, the associated IP address may be released and can be reallocated to another UE.

In some embodiments, a cellular network provider may perform Network Address Translation (NAT) timeout, which employs a timer to maintain a dedicated internet protocol (IP) address for a particular UE device during an active connection. In some embodiments, the NAT timeout function can be performed by one or more routers. For example, during an active connection, a router may restart a NAT timer every time a message (or other communication) is received from a UE. If the NAT timer expires (e.g., the router has not received a communication from the UE for the duration of the timer), the router may determine that the UE is non-responsive and may terminate the connection. Further, the IP address assigned to the UE may be reallocated, e.g., to another UE. In order to avoid termination of the connection, a UE that is not actively communicating (e.g., transmitting data or other messages) over an active connection may periodically transmit a 'keep alive' message over the connection. Transmission of the keep alive message will cause the router to reset the timer associated with the connection, so that a NAT timeout does not occur. In some embodiments, the keep alive message will be transmitted upon the expiration of a timer (e.g., a keep alive timer), or other such duration, maintained by the UE. For example, the UE can establish a duration that is shorter than the expected NAT timeout associated with a serving router and transmit a keep alive message over the active connection upon the passing of that duration, if no other communication has been transmitted. In some embodiments, the duration can be dynamically managed, e.g., to reduce the amount of power associated with maintaining the active connection.

FIG. 4—Keep Alive Interval Fallback

FIG. 4 is a flowchart diagram illustrating an example method for performing keep alive interval fallback, according to some embodiments.

At 410, the UE may establish a connection with a network carrier. The connection may be any of a variety of types of connections, such as a TCP connection, an MPTCP connection, a push connection, or another type of connection. Establishing the connection may involve the network carrier assigning a unique IP address to the UE for the duration of the connection.

During the connection, the UE may be configured to send keep alive messages at a particular interval (or after a particular duration), called a keep alive interval. If the UE uses the connection to send active data traffic, the UE may reset the keep alive interval (or a timer associated with the keep alive interval), since transmitting a keep alive message may only be necessary if the UE has not utilized the connection for active data traffic (or active data communications) during the duration of the keep alive interval.

Sending a keep alive message more frequently than necessary may result in an unnecessary drain on the battery life of the UE. For example, the UE will need to activate one or more components (e.g., interfaces and/or processors) to transmit the keep alive message. As such, it may be desirable for the UE to perform a ramp up procedure to determine a keep alive interval that is shorter than, but approximates, the NAT timeout. For example, using a keep alive interval that is only slightly shorter than the NAT timeout interval will allow the UE to keep the connection active while reducing the number of keep alive messages that need to be transmitted. In some embodiments, during a ramp up procedure, the UE may dynamically increase the period of time between successive keep alive messages (e.g., the keep alive interval) until a connection failure is encountered. The keep alive interval can be increased at any rate, using linear or non-linear increments. For example, in some implementations, the keep alive interval can be increased in large increments until a connection time out event and then increased in smaller increments from the last successful keep alive interval. In some other implementations, the UE may double the length of time (or increase the length of time by some other factor) between keep alive messages after each successful keep alive message (a keep alive message may be considered successful, for example, if the UE receives an acknowledgement (ACK) to the keep alive message, indicating that the connection is still active). During this procedure, the UE may determine that the connection has been terminated when an ACK is no longer received in response to a keep alive message (e.g., because the interval between keep alive messages was too long and the router has terminated the connection). In other implementations, other strategies can be employed to identify a suitable keep alive interval.

In these embodiments, when a keep alive message fails, the UE may reestablish the connection in a steady state configuration, wherein the UE utilizes the longest successful keep alive interval for transmitting keep alive messages. At 420, the UE may send keep alive messages to the router according to the steady state configuration.

In other embodiments, a multistage ramp up procedure may be used. In these embodiments, after a connection failure is detected, the UE may reestablish a connection and use a slower ramp up procedure for further increases to the keep alive interval. For example, if the UE doubled the keep alive interval after each keep alive message during the first ramp up stage, upon detecting a connection failure, the UE may select the longest successful keep alive interval and then increase the keep alive interval by a constant amount after each subsequent successful keep alive message. Once the next connection failure is detected, the UE may then reestablish the connection in a steady state configuration using the last successful keep alive interval. The UE may then maintain the steady state configuration, using the last successful keep alive interval throughout the communication session. In this manner, the UE may learn to use a keep alive interval that is close to the NAT timeout period, but that may be used without triggering further NAT timeouts for the particular connection. Other possibilities may also be used for this ramp up procedure.

Routers associated with a particular network may have the same duration for performing a NAT timeout. However, for some other networks, different routers associated with the same network may employ different NAT timeout periods (for example, based on hardware capabilities or configurations of the different routers). Regional offices may deploy equipment in different ways and a single network may employ a mix of different hardware with various specifications and different NAT timeout parameters. Further, in some implementations, one or more routers associated with a network may not employ a consistent NAT timeout period. Accordingly, a keep alive interval that was previously determined to be effective may stop being effective and may result in the termination of a connection due to a NAT timeout.

During an active connection, a UE may transition from communicating through a first router of the network (e.g., with a first NAT timeout), to a second router of the network (e.g., with a second NAT timeout). For example, if the UE is mobile, it may move from being within range of the first router to being in range of the second router, while maintaining a single active connection. In such circumstances, the keep alive interval that was learned (e.g., during the ramp up procedure) for the first router may be too long for the second router. Additionally or alternatively, the router serving the UE may dynamically change its NAT timeout interval, e.g., in response to increased utilization.

At 430, the UE may determine that an ACK has not been received in response to a keep alive message. The UE may then determine that a previously acceptable keep alive interval has resulted in termination of the connection, e.g., as a result of a NAT timeout. In order to prevent further disruptions of the connection, at 440 the UE may fall back to a default keep alive interval. For example, the UE can implement a minimum acceptable keep alive interval or any other keep alive interval that will provide a stable connection.

As one example, the default keep alive interval may be the same interval that is initially used by the UE during the keep alive ramp up procedure. In other examples, the default keep alive interval can be shorter or longer than the initial keep alive interval configured during a ramp up procedure.

Further, the UE may persist in a steady state configuration using the default keep alive interval for a predetermined period of time. For example, in some embodiments, if a keep alive message attempt fails during the steady state configuration, the UE may enter a keep alive fallback state for a predetermined period of time (e.g., for a 24-hour period or for any other period of time). The predetermined period of time may be selected to balance between the power cost of having a shorter keep alive interval and the desirability of avoiding connection failures. For example, the UE may not be able to receive communications until a link failure is discovered (e.g., upon an unsuccessful keep alive attempt), and thus delivery of communications such as notifications and/or messages may be delayed. In some embodiments, the predetermined period of time may be user-selected. After the predetermined period of time, the UE may resume its normal procedure for determining a keep alive interval. For example, after expiration of the predetermined period, the UE may initiate a ramp up procedure to dynamically determine a longer keep alive interval. Additionally or alternatively, in some embodiments, the UE may resume the procedure for dynamically determining a keep alive interval upon a handover to a different router associated with the same network and/or upon a handover to a different router associated with a different network.

In some embodiments, and as detailed below, the UE may require an additional condition or set of conditions to be satisfied before triggering keep alive interval fallback.

For example, in some embodiments, the UE may further determine whether to perform keep alive interval fallback based on the carrier involved. For example, if a keep alive message fails during a steady state configuration, the UE may check which carrier is associated with the connection. If the carrier is determined to be a timeout-limited carrier, the UE may perform a keep alive interval fallback to a predetermined fallback interval, such as a default keep alive interval. In some embodiments, a list of carriers known to employ routers with variable, different, and/or limited NAT timeout durations can be generated and maintained, and the list may be stored on a memory of the UE. Otherwise, if the carrier associated with the connection is not determined to be a timeout-limited carrier, the UE may determine not to perform a keep alive interval fallback, e.g., to a default keep alive interval, even though a keep alive message has failed. Instead, the UE can perform a fallback to a previously successful keep alive interval and determine whether to implement a ramp up procedure or to maintain a steady state, e.g., for a predetermined period of time or until a predetermined condition (e.g., a handover) occurs.

In some embodiments, triggering a keep alive interval fallback may be further performed based on an amount of movement of the UE. For example, if the UE is moving above a predetermined threshold rate, it may be more likely that the UE will connect to a different router, e.g., that may have an unknown and possibly shorter NAT timeout duration. Thus, if a keep alive message fails during a steady state configuration, the UE may perform a keep alive interval fallback to a default keep alive interval and steady state only if it also is determined that the UE is moving at a rate that exceeds the predetermined threshold. The movement of the UE may be determined through a variety of methods, such as gyroscopes, global positioning satellite technology, cell tower trilateration, beacons, or any of a variety of other methods.

In some embodiments, triggering keep alive interval fallback, e.g., to a default keep alive interval and steady state, may be performed further based on a location of the UE. For example, the UE may have stored in memory a list of locations (e.g., country, region, etc.) that are known to be associated with timeout-limited carriers. For example, the UE may now that certain locations or regions are typically (or often) served by a timeout-limited router. If a keep alive message fails during a steady state configuration, the UE may additionally determine whether it is located in one of a predetermined set of potential timeout-limited locations. The UE may then trigger a keep alive interval fallback, e.g., to a default keep alive interval and steady state, if it is determined that it is in a potential timeout-limited location. Otherwise, the UE may not trigger a keep alive interval fallback.

In some embodiments, the UE may determine to resume normal operations (e.g., by initiating the keep alive ramp up procedure) after performing a keep alive interval fallback, but before expiration of the predetermined period of time, if certain conditions are met. As one example, the normal keep alive interval procedure may be resumed when the UE has changed location, e.g., beyond a threshold distance. As previously noted, location can be determined using one or more sensors or other such techniques for location determination. Further, an event can be used to determine a change in location, such as the UE toggling airplane mode on and off during the keep alive interval fallback period. The UE may resume normal operations (e.g., the UE may reinitiate a keep alive ramp up procedure) upon detecting that airplane mode has been switched off.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for performing keep-alive interval fallback, the method comprising:
 by a UE comprising a processor and a radio:
  establishing a connection with a remote device;
  performing a ramp up procedure to a steady state period for sending a keep alive message;
  after performing the ramp up procedure, sending the keep alive message a first plurality of times to the remote device according to the steady state period;
  determining that the connection has failed based at least in part on a failure to receive feedback from the remote device in response to the keep alive message;
  shortening the steady state period for sending keep alive messages for a first duration of time based at least in part on the determination that the connection has failed;
  sending the keep alive message a second plurality of times to the remote device according to the shortened steady state period during the first duration of time; and
  reperforming the ramp up procedure upon expiration of the first duration of time.

2. The method of claim 1, the method further comprising: determining that the remote device is associated with a timeout-limited carrier, wherein shortening the steady state period for sending keep alive messages is performed further based on the determination that the remote device is associated with the timeout-limited carrier.

3. The method of claim 1, the method further comprising: determining an amount of movement of the UE; shortening the steady state period for sending keep alive messages for the first duration of time further based on a determined amount of movement of the UE exceeding a predetermined threshold.

4. The method of claim 1, the method further comprising: determining that the UE has toggled airplane mode on and off; performing a ramp up procedure for sending the keep alive message in response to the determination that the UE has toggled airplane mode on and off.

5. The method of claim 1, wherein shortening the steady state period for sending keep alive messages for the first duration of time is performed further based on a determination that the UE is in a first location.

6. The method of claim 1, wherein the established connection is a cellular connection.

7. The method of claim 1, wherein the established connection is a WI-FI connection.

8. A user equipment device (UE), comprising:
 a radio; and
 one or more processors coupled to the radio;
 wherein the one or more processors and the radio are configured to:
  establish a connection with a remote device;
  perform a ramp up procedure to a steady state period for sending a keep alive message;
  after performing the ramp up procedure, send the keep alive message to the remote device a first plurality of times according to the steady state period;
  determine that the connection has failed based at least in part on a failure to receive feedback from the remote device in response to the keep alive message;
  shorten the steady state period for sending keep alive messages for a first duration of time based at least in part on the determination that the connection has failed;
  send the keep alive message to the remote device a second plurality of times according to the shortened steady state period during the first duration of time; and
  reperform the ramp up procedure upon expiration of the first duration of time.

9. The UE of claim 8, wherein the one or more processors and the radio are further configured to:
 determine that the remote device is associated with a timeout-limited carrier, wherein shortening the steady state period for sending keep alive messages is performed further based on the determination that the remote device is associated with the timeout-limited carrier.

10. The UE of claim 8, wherein the one or more processors and the radio are further configured to:
 determine an amount of movement of the UE;
 shorten the steady state period for sending keep alive messages for the first duration of time further based on a determined amount of movement of the UE exceeding a predetermined threshold.

11. The UE of claim 8, wherein the one or more processors and the radio are further configured to:
 determine that the UE has toggled airplane mode on and off;
 perform a ramp up procedure for sending the keep alive message in response to the determination that the UE has toggled airplane mode on and off.

12. The UE of claim 8,
 wherein shortening the steady state period for sending keep alive messages for the first duration of time is performed further based on a determination that the UE is in a first location.

13. The UE of claim 8, wherein the established connection is one or a cellular connection or a WI-FI connection.

14. A non-transitory computer-readable memory medium that stores program instructions that, when executed by a processor of a user equipment device (UE), cause the UE to:
 establish a connection with a remote device;
 perform a ramp up procedure to a steady state period for sending a keep alive message;
 send the keep alive message to the remote device a first plurality of times according to the steady state period;
 determine that the connection has failed based at least in part on a failure to receive feedback from the remote device in response to the keep alive message;
 shorten the steady state period for sending keep alive messages for a first duration of time based at least in part on the determination that the connection has failed;

periodically send the keep alive message to the remote device a second plurality of times according to the shortened steady state period during the first duration of time; and reperform the ramp up procedure upon expiration of the first duration of time.

15. The non-transitory computer-readable memory medium of claim 14, wherein the program instructions are further executable to cause the UE to:

determine an amount of movement of the UE;

shorten the steady state period for sending keep alive messages for the first duration of time further based on a determined amount of movement of the UE exceeding a predetermined threshold.

16. The non-transitory computer-readable memory medium of claim 14, wherein the program instructions are further executable to cause the UE to:

determine that the UE has toggled airplane mode on and off;

perform a ramp up procedure for sending the keep alive message in response to the determination that the UE has toggled airplane mode on and off.

17. The non-transitory computer-readable memory medium of claim 14, wherein the established connection is a cellular connection.

18. The non-transitory computer-readable memory medium of claim 14, wherein the established connection is a WI-FI connection.

19. The non-transitory computer-readable memory medium of claim 14, wherein the program instructions are further executable to cause the UE to:

determine that the remote device is associated with a timeout-limited carrier, wherein shortening the steady state period for sending keep alive messages is performed further based on the determination that the remote device is associated with the timeout-limited carrier.

20. The non-transitory computer-readable memory medium of claim 14, wherein shortening the steady state period for sending keep alive messages for the first duration of time is performed further based on a determination that the UE is in a first location.

\* \* \* \* \*